(12) United States Patent
Bennett et al.

(10) Patent No.: US 7,237,051 B2
(45) Date of Patent: Jun. 26, 2007

(54) MECHANISM TO CONTROL HARDWARE INTERRUPT ACKNOWLEDGEMENT IN A VIRTUAL MACHINE SYSTEM

(75) Inventors: Steven M. Bennett, Hillsboro, OR (US); Erik Cota-Robles, Portland, OR (US); Stalinselvaraj Jeyasingh, Portland, OR (US); Gilbert Neiger, Portland, OR (US); Richard Uhlig, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 528 days.

(21) Appl. No.: 10/676,887

(22) Filed: Sep. 30, 2003

(65) Prior Publication Data

US 2005/0080965 A1    Apr. 14, 2005

(51) Int. Cl.
*G06F 9/46* (2006.01)
(52) U.S. Cl. ........................ 710/260; 710/268
(58) Field of Classification Search ............... None
See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. | |
| 4,276,594 A | 6/1981 | Morley | |
| 4,278,837 A | 7/1981 | Best | |
| 4,307,447 A | 12/1981 | Provanzano et al. | |
| 4,319,233 A | 3/1982 | Matsuoka et al. | |
| 4,319,323 A | 3/1982 | Ermolovich et al. | |
| 4,347,565 A | 8/1982 | Kaneda et al. | |
| 4,366,537 A | 12/1982 | Heller et al. | |
| 4,403,283 A | 9/1983 | Myntti et al. | |
| 4,419,724 A | 12/1983 | Branigin et al. | |
| 4,430,709 A | 2/1984 | Schleupen et al. | |
| 4,521,852 A | 6/1985 | Guttag | |

(Continued)

FOREIGN PATENT DOCUMENTS

DE    4217444    12/1992

(Continued)

OTHER PUBLICATIONS

Hall, Judith S., et al., "Virtualizing the VAX Architecture," ACM SIGARCH Computer Architecture News, Proceedings of the 18th annual international symposium on Computer architecture, vol. 19, Issue No. 3, Apr. 1991, 10 pages.

(Continued)

*Primary Examiner*—Glenn A. Auve
(74) *Attorney, Agent, or Firm*—Blakely, Sokoloff, Taylor & Zafman LLP (57) ABSTRACT

In one embodiment, a method includes recognizing an interrupt pending during an operation of guest software, determining that the interrupt is to cause a transition of control to a virtual machine monitor (VMM), determining whether the interrupt is to be acknowledged prior to the transition of control to the VMM, and if the interrupt is to be acknowledged, acknowledging the interrupt and transitioning control to the VMM.

24 Claims, 4 Drawing Sheets

U.S. PATENT DOCUMENTS

| | | |
|---|---|---|
| 4,571,672 A | 2/1986 | Hatada et al. |
| 4,621,318 A | 11/1986 | Maeda |
| 4,759,064 A | 7/1988 | Chaum |
| 4,764,864 A | 8/1988 | Takane |
| 4,795,893 A | 1/1989 | Ugon |
| 4,802,084 A | 1/1989 | Ikegaya et al. |
| 4,812,967 A | 3/1989 | Hirosawa et al. |
| 4,825,052 A | 4/1989 | Chemin et al. |
| 4,907,270 A | 3/1990 | Hazard |
| 4,907,272 A | 3/1990 | Hazard et al. |
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Holtey et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubals |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. ...... 711/163 |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle et al. |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,944,821 A | 8/1999 | Angelo |
| 5,953,502 A | 9/1999 | Helbig, Sr. |
| 5,956,408 A | 9/1999 | Arnold |
| 5,970,147 A | 10/1999 | Davis |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo et al. |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Isley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. ......... 713/200 |
| 6,252,650 B1 | 6/2001 | Nakamura |
| 6,269,392 B1 | 7/2001 | Cotichini et al. |
| 6,272,533 B1 | 8/2001 | Browne et al. ............. 709/213 |
| 6,272,637 B1 | 8/2001 | Little et al. ................. 713/194 |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett ...................... 711/153 |
| 6,301,646 B1 | 10/2001 | Hostetter |
| 6,308,270 B1 | 10/2001 | Guthery |
| 6,314,409 B2 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng |
| 6,339,816 B1 | 1/2002 | Bausch |

| | | |
|---|---|---|
| 6,357,004 B1 | 3/2002 | Davis |
| 6,363,485 B1 | 3/2002 | Adams et al. |
| 6,374,286 B1 | 4/2002 | Gee et al. |
| 6,374,317 B1 | 4/2002 | Ajanovic et al. ........... 710/105 |
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough |
| 6,463,535 B1 | 10/2002 | Drews |
| 6,463,537 B1 | 10/2002 | Tello |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B2 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2002/0007456 A1 | 1/2002 | Peinado et al. |
| 2002/0023032 A1 | 2/2002 | Pearson et al. |
| 2002/0147916 A1 | 10/2002 | Strongin et al. |
| 2002/0166061 A1 | 11/2002 | Falik et al. |
| 2002/0169717 A1 | 11/2002 | Challener |
| 2003/0018892 A1 | 1/2003 | Tello |
| 2003/0074548 A1 | 4/2003 | Cromer et al. |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0188179 A1 | 10/2003 | Challener et al. |
| 2003/0196085 A1 | 10/2003 | Lampson et al. |
| 2004/0117539 A1 | 6/2004 | Bennett et al. |

FOREIGN PATENT DOCUMENTS

| | | |
|---|---|---|
| EP | 0290942 A | 11/1988 |
| EP | 0473913 | 3/1992 |
| EP | 0600112 | 6/1994 |
| EP | 0602867 | 6/1994 |
| EP | 0892521 | 1/1999 |
| EP | 0930567 | 7/1999 |
| EP | 0961193 | 12/1999 |
| EP | 0965902 | 12/1999 |
| EP | 1030237 | 8/2000 |
| EP | 1055989 | 11/2000 |
| EP | 1056014 | 11/2000 |
| EP | 1085396 | 3/2001 |
| EP | 1146715 | 10/2001 |
| EP | 1209563 | 5/2002 |
| EP | 1271277 | 1/2003 |
| JP | 2000076139 | 3/2000 |
| WO | WO9524696 | 9/1995 |
| WO | WO9729567 | 8/1997 |
| WO | WO9812620 | 3/1998 |
| WO | WO9834365 | 8/1998 |
| WO | WO9844402 | 10/1998 |
| WO | WO9905600 | 2/1999 |
| WO | WO9918511 | 4/1999 |
| WO | WO9957863 | 11/1999 |
| WO | WO9965579 | 12/1999 |
| WO | WO0021238 | 4/2000 |
| WO | WO0062232 | 10/2000 |
| WO | WO0127723 | 4/2001 |
| WO | WO0127821 | 4/2001 |
| WO | WO0163994 | 8/2001 |
| WO | WO0175565 | 10/2001 |
| WO | WO0175595 | 10/2001 |
| WO | WO0201794 | 1/2002 |
| WO | WO9909482 | 1/2002 |
| WO | WO0217555 | 2/2002 |
| WO | WO02060121 | 8/2002 |
| WO | WO0175564 | 10/2002 |
| WO | WO02086684 | 10/2002 |
| WO | WO03058412 | 7/2003 |

OTHER PUBLICATIONS

PCT International Search Report for PCT Application No. PCT/US2004/032111. Mailed on Sep. 29, 2004 (6 pages).

Coulouris, George, et al., "Distributed Systems, Concepts and Designs", *2nd Edition*, (1994),422-424.

Crawford, John, "Architecture of the Intel 80386", *Proceedings of the IEEE International Conference on Computer Design: VLSI in Computers and Processors (ICCD '86)*, (Oct. 6, 1986), 155-160.

Fabry, R.S., "Capability-Based Addressing", Fabry, R.S., "Capability-Based Addressing," Communications of the ACM, vol. 17, No. 7, (Jul. 1974),403-412.

Frieder, Gideon, "The Architecture And Operatonal Characteristics of the VMX Host Machine", *The Architecture And Operational Characteristics of the VMX Host Machine, IEEE*, (1982), 9-16.

HP Mobile Security Overview, "HP Mobile Security Overview", (Sep. 2002),1-10.

IBM Corporation, "IBM ThinkPad T30 Notebooks", *IBM Product Specification*, located at www-1.ibm.com/services/files/cisco_130_spec_sheet_070202.pdf, last visited Jun. 23, 2004, Jul. 2, 2002),1-6.

INTEL, "IA-32 Intel Architecture Software Developer's Manual", vol. 3: *System Programming Guide*, Intel Corporation—2003, 13-1 through 13-24.

Intel Corporation, "IA-64 System Abstraction Layer Specification", *Intel Product Specification, Order No. 245359-001*, (Jan. 2000),1-112.

Intel Corporation, "Intel 82802AB/82802AC Firmware Hub (FWH)", *Intel Product Datasheet*, Document No. 290658-004,(Nov. 2000),1-6, 17-28.

Intel Corporation, "Intel IA-64 Architecture Software Developer's Manual", vol. 2: *IA-64 System Architecture*, Order No. 245318-001, (Jan. 2000), i, ii, 5.1-5.3, 11.1-11.8, 11.23-11.26.

Menezes, Alfred J., et al., "Handbook of Applied Cryptography", *CRC Press Series on Discrete Mathematics and its Applications*, Boca Raton, FL, XP002165287, ISBN 0849385237,(Oct. 1996),403-405, 506-515, 570.

Nanba, S., et al., "VM/4: ACOS-4 Virtual Machine Architecture", *VM/4: ACOS-4 Virtual Machine Architecture, IEEE*, (1985), 171-178.

RSA SECURITY, "Hardware Authenticators", www.rsasecurity.com/node.asp?id=1158, 1-2.

RSA SECURITY, "RSA SecurID Authenticators", www.rsasecurity.com/products/securid/datasheets/SID_DS_0103.pdf, 1-2.

RSA SECURITY, "Software Authenticators", www.srasecurity.com/node.asp?id=1313, 1-2.

Schneier, Bruce, "Applied Cryptography: Protocols, Algorithm, and Source Code in C", *Wiley, John & Sons, Inc.*, XP002939871; ISBN 0471117099, (Oct. 1995), 47-52.

Schneier, Bruce, "Applied Cryptography: Protocols, Algorithm, and Source Code in C", *Wiley, John & Sons, Inc.*, XP002138607; ISBN 0471117099,Oct. 1995), 56-65.

Schneier, Bruce, "Applied Cryptography: Protocols, Algorithms, and Source Code C", *Wiley, John & Sons, Inc.*, XP0021111449; ISBN 0471117099, (Oct. 1995), 169-187.

Schneier, Bruce, "Applied Cryptography: Protocols, Algorithms, and Source Code in C", *2nd Edition; Wiley, John& Sons, Inc.*, XP002251738; ISBN 0471128457, (Nov. 1995), 28-33; 176-177; 216-217; 461-473; 518-522.

Berg, Cliff , "How Do I Create a Signed Applet?", *Dr. Dobb's Journal*, (Aug. 1997), 1-9.

Brands, Stefan , "Restrictive Blinding of Secret-Key Certificates", *Springer-Verlag XP002201306*, (1995), Chapter 3.

Chien, Andrew A., et al., "Safe and Protected Execution for the Morph/AMRM Reconfigurable Processor", *7th Annual IEEE Symposium, FCCM '99 Proceedings, XP01359180, ISBN 0-7695-0375-6, Los Alamitos, CA*, (Apr. 21, 1999), 209-221.

Compaq Computer Corporation, Trusted Computing Platform Alliance.

(TCPA) Main Specification Version 1.1a, *XP002272822*, (Jan. 25, 2001), 1-321.

Davida, George I., et al., "Defending Systems Against Viruses through Cryptographic Authentication", *Proceedings of the Symposium on Security and Privacy*, IEEE Comp. Soc. Press, ISBN 0-8186-1939-2, (May 1989).

Goldberg, Robert P., "Survey of Virtual Machine Research", *COMPUTER Magazine*, (Jun. 1974), 34-35.

Gong, Li, et al., "Going Behond the Sandbox: An Overview of the New Security Architecture in the Java Development Kit 1.2", *Proceedings of the USENIX Symposium on Internet Technologies and Systems*, Monterey, CA, (Dec. 1997).

Gum, P. H., "System/370 Extended Architecture: Facilities for Virtual Machines", *IBM J. Research Development, vol. 27, No. 6*, (Jun. 11, 1993), 61-97.

Heinrich, Joe , "MIPS R4000 Microprocessor User's Manual, Second Edition", *Chapter 4 Memory Management*, (Jun. 11, 1993), 61-97.

IBM, "Information Display Technique for a Terminate Stay Resident Program IBM Technical Disclosure Bulletin", *TDB-ACC-No. NA9112156, vol. 34, Issue 7A*, (Dec. 1, 1991), 156-158.

Intel, "Intel386 DX Microprocessor 32-Bit CHMOS Microprocessor With Integrated Memory Management", (1995), 5-56.

Karger, Paul A., et al., "A VMM Security Kernal for the VAX Architecture", *Proceedings of the Symposium on Research in Security and Privacy, XP010020182, ISBN 0-8186-2060-9, Boxborough, MA*, (May 7, 1990), 2-19.

Kashiwagi, Kazuhiko , et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Lawton, Kevin , et al., "Running Multiple Operating Systems Concurrently on an IA32 PC Using Virtualization Techniques", http://www.plex86.org/research/paper.txt. (Nov. 29, 1999), 1-31.

Luke, Jahn , et al., "Replacement Strategy for Aging Avionics Computers", *IEEE AES Systems Magazine*, XP002190614,(Mar. 1999).

Menezes, Alfred J., et al., "Handbook of Applied Cryptography", *CRC Press LLC, USA XP002201307*, (1997),475.

Motorola, "M68040 User's Manual", (1993), 1-1 to 8-32.

Richt, Stefan, et al., "In-Circuit Emulator Wird Echtzeittauglich", *Elecktronic, Franzis Verlag GmbH, Munchen, DE.* vol. 40, No. 16, XP000259620,(100-103), Aug. 6, 1991.

Robin, John S., et al., "Analysis of the Pentium's Ability to Support a Secure Virtual Machine Monitor", *Proceedings of the 9th USENIX Security Symposium, XP002247347, Denver, Colorado*, (Aug. 14, 2000), 1-17.

Rosenblum, M. , "Virtual Platform: A Virtual Machine Monitor for Commodity PC", *Proceedings of the 11th Hotchips Conference*, (Aug. 17, 1999), 185-196.

Saez, Sergio , et al., "A Hardware Scheduler for Complex Real-Time Systems", *Proceedings of the IEEE International Symposium on Industrial Electronics*, XP002190615, (Jul. 1999), 43-48.

Sherwood, Timothy , et al., "Patchable Instruction ROM Architecture", *Department of Computer Science and Engineering, University of California, San Diego, La Jolla, CA*, (Nov. 2001).

MECHANISM TO CONTROL HARDWARE INTERRUPT ACKNOWLEDGEMENT IN A VIRTUAL MACHINE SYSTEM

FIELD

Embodiments of the invention relate generally to virtual machines, and more specifically to controlling hardware interrupt acknowledgement in a virtual machine system.

BACKGROUND OF THE INVENTION

In a typical computer system, devices request services from system software by generating interrupt requests, which are propagated to an interrupt controller via multiple interrupt request lines. Once the interrupt controller identifies an active interrupt request line, it may send an interrupt signal to the processor. In response, the processor determines whether the software is ready to receive the interrupt. If the software is not ready to receive the interrupt, the interrupt is held in a pending state until the software becomes ready. Once the software is determined to be ready, the processor performs an interrupt acknowledgment cycle on the processor bus to request that the interrupt controller report which of the pending interrupts is of the highest priority. The interrupt controller prioritizes among the various interrupt request lines and identifies the highest priority interrupt request to the processor. The processor uses this interrupt identifier, known as the interrupt vector, to search an interrupt descriptor table (IDT) for an interrupt descriptor pointing to code for handling this interrupt and then jumps to the handler code.

In a conventional operating system (OS), all the interrupts are controlled by a single entity known as an OS kernel. In a virtual machine system, a virtual-machine monitor (VMM) should have ultimate control over various operations and events occurring in the system to provide proper operation of virtual machines and for protection from and between virtual machines. To achieve this, the VMM typically receives control when guest software accesses a hardware resource or when certain events such as an interrupt or an exception occur. In particular, when a system device generates an interrupt, control may be transferred from the virtual machine to the VMM.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EMBODIMENTS

A method and apparatus for controlling external interrupts in a virtual machine system are described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Although the below examples may describe interrupt acknowledgement control in the context of execution units and logic circuits, other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware components that contain hardwired logic for performing the steps, or by any combination of programmed computer components and custom hardware components.

Thus, a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like.

Further, a design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

Figure 1:
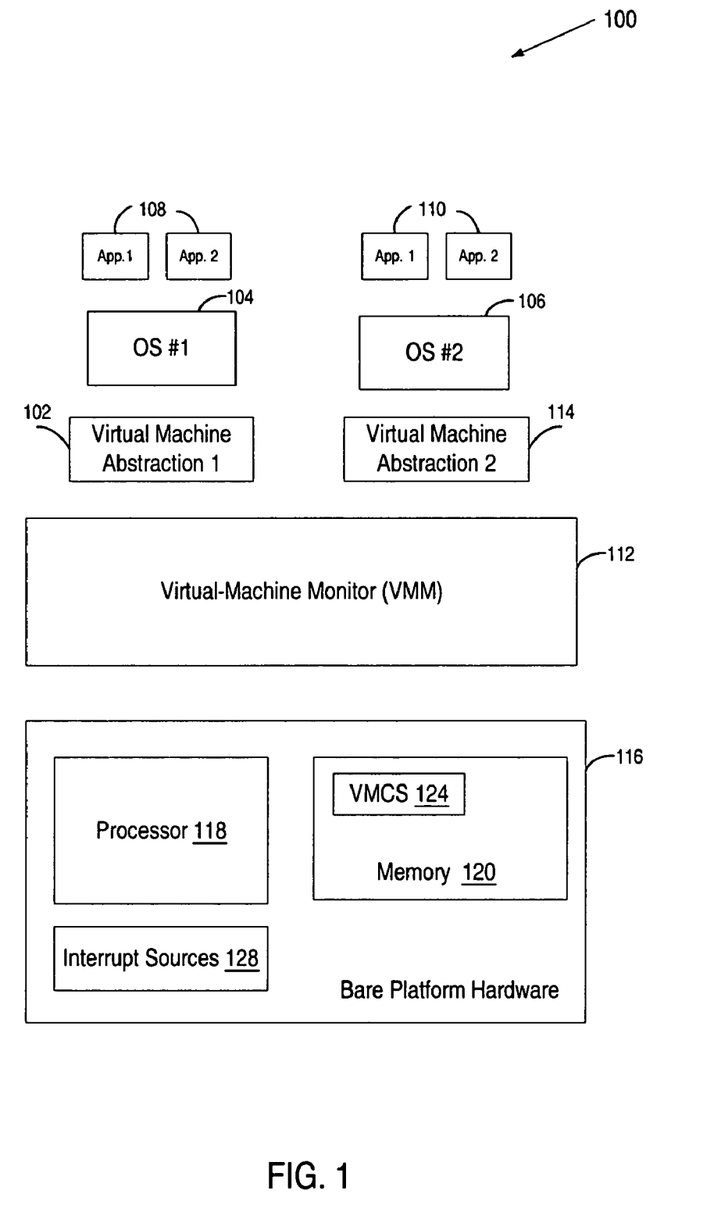
FIG. 1 illustrates one embodiment of a virtual-machine environment, in which the present invention may operate.

FIG. 1 illustrates one embodiment of a virtual-machine environment 100, in which the present invention may operate. In this embodiment, bare platform hardware 116 comprises a computing platform, which may be capable, for example, of executing a standard operating system (OS) or a virtual-machine monitor (VMM), such as a VMM 112.

The VMM 112, though typically implemented in software, may emulate and export a bare machine interface to higher level software. Such higher level software may comprise a standard or real-time OS, may be a highly stripped down operating environment with limited operating system functionality, may not include traditional OS facilities, etc. Alternatively, for example, the VMM 112 may be run within, or on top of, another VMM. VMMs may be implemented, for example, in hardware, software, firmware or by a combination of various techniques.

The platform hardware 116 can be of a personal computer (PC), mainframe, handheld device, portable computer, set-top box, or any other computing system. The platform hardware 116 includes a processor 118, memory 120 and one or more interrupt sources 128.

Processor 118 can be any type of processor capable of executing software, such as a microprocessor, digital signal processor, microcontroller, or the like. The processor 118 may include microcode, programmable logic or hardcoded logic for performing the execution of method embodiments of the present invention. Though FIG. 1 shows only one such processor 118, there may be one or more processors in the system.

Memory 120 can be a hard disk, a floppy disk, random access memory (RAM), read only memory (ROM), flash memory, any combination of the above devices, or any other type of machine medium readable by processor 118. Memory 120 may store instructions and/or data for performing the execution of method embodiments of the present invention.

The one or more interrupt sources 128 may be, for example, input-output (I/O) devices (e.g., network interface cards, communication ports, video controllers, disk controllers) on system buses (e.g., PCI, ISA, AGP), devices integrated into the chipset logic or processor (e.g., real-time clocks, programmable timers, performance counters), or any other source of interrupts.

The VMM 112 presents to other software (i.e., "guest" software) the abstraction of one or more virtual machines (VMs), which may provide the same or different abstractions to the various guests. FIG. 1 shows two VMs, 102 and 114. The guest software running on each VM may include a guest OS such as a guest OS 104 or 106 and various guest software applications 108 and 110. Each of the guest OSs 104 and 106 expect to access physical resources (e.g., processor registers, memory and I/O devices) within the VMs 102 and 114 on which the guest OS 104 or 106 is running and to handle various events including interrupts generated by system devices.

An interrupt may need to be handled by a currently operating VM, the VMM 112 or a VM that is not currently operating. If the interrupt is to be handled by the currently-operating VM, control remains with this VM, and the interrupt is delivered to this VM if it is ready to receive interrupts (as indicated, for example, by an interrupt flag in a designated processor register). If the interrupt is not to be handled by the currently operating VM, control is transferred to the VMM 112. The transfer of control from guest software to the VMM 112 is referred to herein as a VM exit. After receiving control following the VM exit, the VMM 112 may perform a variety of processing, including, for example, acknowledging and handling the interrupt, after which it may return control to guest software. If the VMM does not handle the interrupt itself, it may facilitate delivery of the interrupt to a VM designated to handle the interrupt. The transfer of control from the VMM to guest software is referred to herein as a VM entry.

In one embodiment, the processor 118 controls the operation of the VMs 102 and 114 in accordance with data stored in a virtual machine control structure (VMCS) 124. The VMCS 124 is a structure that may contain state of guest software, state of the VMM 112, execution control information indicating how the VMM 112 wishes to limit or otherwise control operation of guest software, information controlling transitions between the VMM 112 and a VM, etc. When a VM exit occurs, components of the processor state used by guest software are saved to the VMCS 124, and components of the processor state required by the VMM 112 are loaded from the VMCS 124. When a VM entry occurs, the processor state that was saved at the VM exit is restored using data stored in the VMCS 124, and control is returned to guest software.

In one embodiment, the VMCS 124 is stored in memory 120. In another embodiment, the VMCS 124 is stored in the processor 118. In some embodiments, multiple VMCS structures are used to support multiple VMs.

The processor 118 reads information from the VMCS 124 to determine the execution environment of the VM and to constrain its behavior. In one embodiment, the execution control information stored in the VMCS contains an interrupt control indicator that specifies whether an interrupt generated by a system device during the operation of a VM is to cause a VM exit. Alternatively, the interrupt control indicator may reside in the processor 118, a combination of the memory 120 and the processor 118, or in any other storage location or locations.

In one embodiment, the VMM 112 sets the value of the interrupt control indicator before requesting a transfer of control to the VM 102 or 114. Alternatively, each of the VMs 102 and 114 is associated with a different interrupt control indicator that is set to a predefined value or changed during the life of the VM.

If the processor 118 determines that the pending interrupt is to generate a VM exit, the processor 118 then further decides whether this interrupt needs to be acknowledged prior to performing the VM exit. The interrupt acknowledgement involves generating an interrupt acknowledge cycle on a processor bus. In an embodiment, as part of the interrupt acknowledgement cycle, the processor 118 retrieves an identifier of the interrupt (e.g., an interrupt vector) from the interrupt controller. In one embodiment, the determination as to whether the interrupt needs to be acknowledged depends on the current value of an interrupt acknowledge indicator. In one embodiment, the interrupt acknowledge indicator is stored in the VMCS 124 (e.g., as part of the execution control information). Alternatively, the interrupt acknowledge indicator may reside in the processor 118, a combination of the memory 120 and the processor 118, or in any other storage location or locations.

In one embodiment, the interrupt acknowledge indicator is controlled by the VMM 112. In one embodiment, the VMM 112 sets the interrupt acknowledge indicator prior to invoking a VM for the first time. For example, the VMM 112 may set the interrupt acknowledge indicator to an acknowledge value if the VMM 112 has to decide whether to handle an interrupt itself or deliver it to a specific VM based on the interrupt identifier. Alternatively, the VMM 112 may set the interrupt acknowledge indicator to a non-acknowledge value if, for example, one of the VMs 102 and 114 is designated to handle all the interrupts generated by the interrupt sources 128, and the VMM 112 always invokes this designated VM when a VM exist caused by an interrupt occurs. In one embodiment, the interrupt acknowledge indicator is modifiable by the VMM 112. For example, the VMM 112 may decide to change the interrupt acknowledge indicator if initially the system 100 had a designated VM to handle all the interrupts but later a new VM was added that is to handle some of the interrupts generated by interrupt sources 128.

If the processor 118 determines that the interrupt is to be acknowledged before the VM exit, the processor 118 acknowledges the interrupt and then transitions control to the VMM 112. In one embodiment, prior to transitioning control, the processor 118 stores the interrupt identifier obtained as part of the interrupt acknowledgement at a storage location accessible to the VMM 112. In one embodiment, the interrupt identifier is stored in the VMCS 124 (e.g., in one of the exit information fields).

Figure 2:
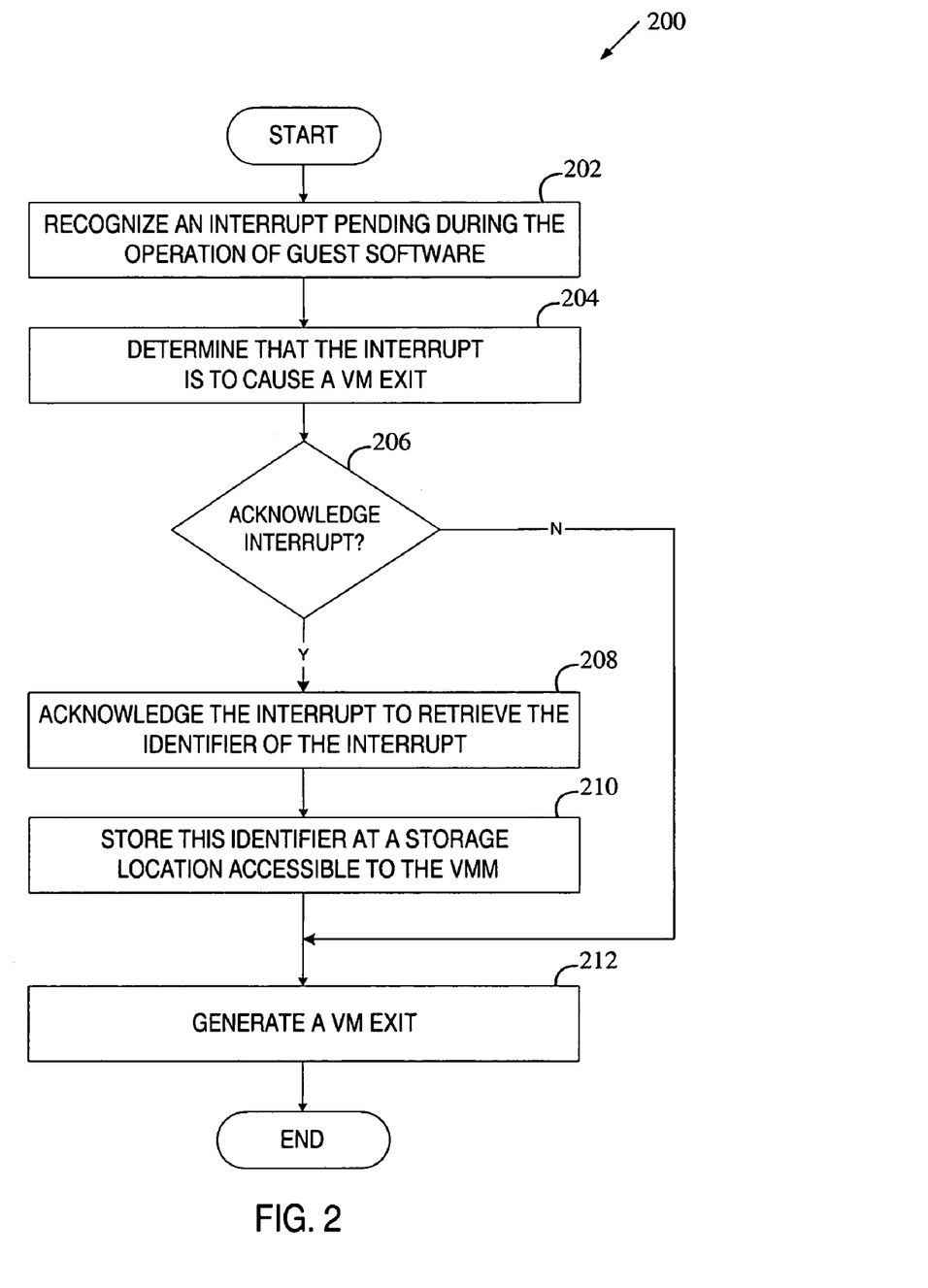
FIG. 2 is a flow diagram of one embodiment of a process for controlling interrupt acknowledgement in a virtual machine system.

FIG. 2 is a flow diagram of one embodiment of a process 200 for controlling interrupt acknowledgement in a virtual machine system. The process may be performed by processing logic that may comprise hardware (e.g., circuitry, dedicated logic, programmable logic, microcode, etc.), software (such as run on a general purpose computer system or a dedicated machine), or a combination of both.

Referring to FIG. 2, process 200 begins with processing logic recognizing an interrupt pending during the operation of guest software (processing block 202).

At processing block 204, processing logic determines that the interrupt is to cause a VM exit. In one embodiment, this determination is made based on the current value of an interrupt control indicator residing in the VMCS or any other data structure. Alternatively, all interrupts may be architecturally required to cause a VM exit, and no interrupt control indicator is needed for this determination.

Next, processing logic further determines whether the interrupt is to be acknowledged prior to transitioning control to the VMM (decision box 206). In one embodiment, the determination is made using an interrupt acknowledge indicator residing in the VMCS or any other data structure. Alternatively, all interrupts may be acknowledged, and no interrupt acknowledge indicator is needed for this determination.

If the determination made at decision box 206 is positive, processing logic acknowledges the interrupt, and, in an embodiment, as part of the acknowledgement, retrieves the identifier of the interrupt (processing block 208) and stores this identifier at a storage location accessible to the VMM (processing block 210). In one embodiment, processing logic stores the interrupt identifier in the VMCS (e.g., in one of the exit information fields). A VM exit is then generated (processing block 212).

If the determination made at decision box 206 is negative, processing logic does not perform processing blocks 208 and 210 and goes directly to processing block 212.

Accordingly, with the use of process 200, performance is improved and functionality of the VMM is simplified. In particular, in systems that do not provide for interrupt acknowledgement prior to a VM exit, interrupts are blocked following every VM exit (e.g., by setting an interrupt flag in a designated processor register). As a result, in an embodiment, in order to determine the vector of the interrupt, the VMM has to unblock interrupts (e.g., by executing an instruction resetting the interrupt flag). The processor then acknowledges the interrupt at the interrupt controller, retrieves the interrupt identifier, searches a redirection structure (e.g., the interrupt-descriptor table (IDT) in the instruction set architecture (ISA) of the Intel® Pentium®4(referred to herein as the IA-32 ISA)) for an entry associated with the interrupt, extracts from this entry a descriptor of a handler associated with this interrupt, and jumps to the beginning of the appropriate VMM handler code using the descriptor. The VMM can then handle the interrupt appropriately since it can identify the interrupt source based on which handler was invoked by the processor. Alternatively, in another embodiment, following the VM exit, a VMM may perform a series of accesses to the interrupt controller (e.g., I/O accesses) to determine the interrupt vector and to acknowledge the interrupt.

With the use of process 200, the interrupt can be acknowledged prior to the VM exit. As a result, the VMM has an immediate access to the interrupt identifying information once the VMM receives control. The VMM can then use the interrupt identifier to find the appropriate interrupt handler code or VM. Consequently, the need for the VMM to unblock the interrupts is eliminated, as well as the need for the processor to search a redirection structure, extract from a corresponding entry a descriptor of a handler associated with this interrupt, and jump to the beginning of the appropriate VMM exception handler code. This, in turn, can simplify the VMM software design and validation because the VMM no longer needs to have necessary code and/or structures as described above (e.g., a redirection structure (e.g., the IDT), code to acknowledge interrupts using I/O operations, etc).

Figure 3:
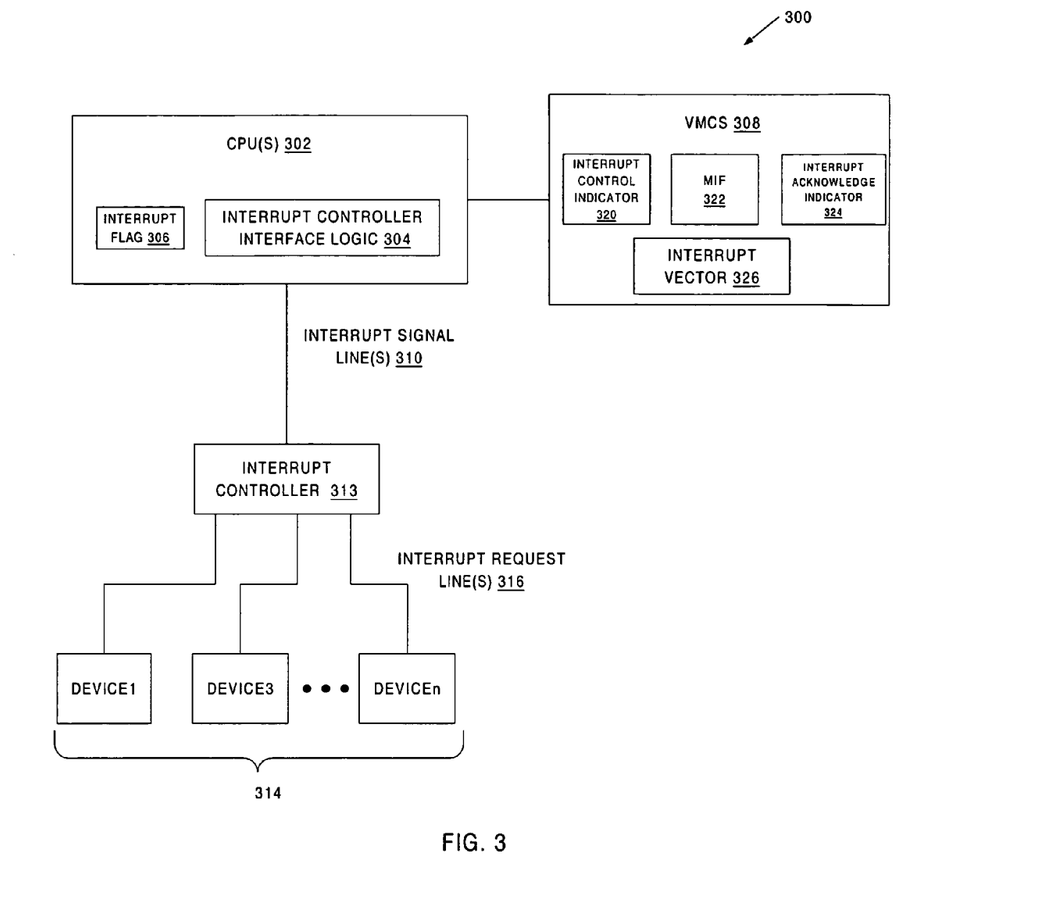
FIG. 3 is a block diagram of one embodiment of a system for processing interrupts in a virtual machine system.

FIG. 3 is a block diagram of one embodiment of a system 300 for processing interrupts in a virtual machine environment.

Referring to FIG. 3, devices 314 (e.g., I/O devices) request services from system software by generating interrupt requests, which are propagated to an interrupt controller 313 via one or more interrupt request lines 316. Once the interrupt controller 313 identifies an active interrupt request line 316, it sends an interrupt signal 310 to the CPU 302. The interrupt controller 313 may include masking and prioritization logic that is know to one skilled in the art. In an embodiment, there may be more than one interrupt signal line 310 to the CPU 302, or, alternatively, the interrupt "signal" may be delivered via a bus message or through any other communication mechanism or protocol.

In response to an active interrupt signal 310 from the interrupt controller 313, interrupt controller interface logic 304 determines which software has control over the interrupt. If the interrupt occurs during the operation of a VMM, the interrupt is managed by the VMM. Alternatively, if the operation occurs during the operation of guest software, the interrupt controller interface logic 304 determines whether the interrupt is controlled by the currently operating guest software or by the VMM. If the interrupt is controlled by the VMM, then a VM exit is generated to transfer control to the VMM.

In one embodiment, this determination depends on the current value of an interrupt control indicator 320 stored in VMCS 308 (e.g., as part of the execution control information). In one embodiment, the VMM sets the value of the interrupt control indicator 320 prior to requesting a VM entry into a specific VM for the first time and does not change the value throughout the life of the VM. For example, if the system has a certain VM that handles all interrupts, the interrupt control indicator 320 for this VM would be set to allow guest control of interrupts; the interrupt control indicator 320 for all other VMs would be set to VMM control. Alternatively, if interrupts can be handled by different VMs and/or the VMM depending on the interrupt identifiers and the VMM needs to decide which entity handles the present interrupt, then the interrupt control indicator 320 may be set to indicate VMM control for all VMs. In yet other embodiments, the value of the interrupt control indicator 320 may change during the lifetime of a particular VM.

If the interrupt control indicator 320 specifies that the interrupt is controlled by the currently operating VM, the interrupt controller interface logic 304 further determines whether the currently operating VM is ready to receive interrupts. In one embodiment, the interrupt controller interface logic 304 makes this determination upon consulting an interrupt flag 306 that can be updated by guest software when the state of guest software's ability to accept interrupts changes. For example, in the IA-32ISA, the EFLAGS register contains the IF interrupt flag bit, which, in part, controls whether an interrupt will be delivered to the software (other factors may block interrupts in the IA-32ISA and these factors must be considered in determining if an interrupt may be delivered). In an embodiment, the interrupt flag 306 resides in the CPU 302 outside or inside the interrupt controller interface logic 304.

If the interrupt controller interface logic 304 determines that the guest software is ready to receive the interrupt, it acknowledges the interrupt request at the interrupt controller 313 by an interrupt acknowledgment cycle, for which, in an embodiment, the interrupt controller 313 returns the identifier of the interrupt (referred to as an interrupt vector) that has the highest priority. Based on the interrupt vector, the interrupt controller interface logic 304 searches the IDT of this VM for an entry associated with the interrupt, extracts from this entry a descriptor of a handler associated with this interrupt, and jumps to the beginning of the appropriate VM exception handler code using the descriptor. In another embodiment, there is a single interrupt handler and no interrupt identifier is required. Otherwise, if the VM is not currently ready to receive interrupts, the interrupt is held in a pending state until the VM becomes ready.

If the interrupt control indicator 320 specifies that the interrupt is controlled by the VMM (i.e., a VM exit is to be generated), then, in one embodiment, the interrupt controller interface logic 304 consults an interrupt transition flag referred to herein as a monitor interrupt flag (MIF) 322. The MIF 322 behaves in a manner that is analogous to the interrupt flag 306, indicating whether interrupts are allowed to cause transitions to the VMM. In one embodiment, the MIF 322 resides in the VMCS 308 and is controlled by the VMM. In another embodiment, the MIF 322 resides in a machine register or in memory. If the MIF 322 indicates that interrupts are blocked, no VM exit will be generated until the MIF 322 is changed to unblock interrupts. The VMM may set the MIF 322 to a blocking value if, for example, the currently operating VM performs a time critical task and the VMM does not want any VM exits to occur to avoid reducing the performance of this VM.

In another embodiment, the interrupt controller interface logic 304 does not consult the MIF 322 and decides whether the interrupt is to cause a VM exit based only on the interrupt control indicator 320.

If the interrupt controller interface logic 304 determines that the interrupt is to cause a VM exit, the interrupt controller interface logic 304 further consults an interrupt acknowledgement indicator 324. The interrupt acknowledgement indicator 324 specifies whether the interrupt is to be acknowledged prior to a VM exit. In one embodiment, the interrupt acknowledgement indicator 324 resides in the VMCS 308 and is controlled by the VMM. In another embodiment, the interrupt acknowledgement indicator 324 resides in a machine register or in memory.

If the interrupt acknowledgement indicator 324 specifies that no acknowledgement is required prior to a VM exit, the interrupt controller interface logic 304 generates a VM exit. The VMM may then, for example, set the interrupt control indicator 320 to a VM control value and request a transition of control to a VM designated to handle all the interrupts. In another example, the VMM may determine the interrupt vector itself (e.g., by accessing an appropriate register of the interrupt controller 312 to read the vector of the interrupt).

If the interrupt acknowledgement indicator 324 specifies that the interrupt is to be acknowledged, the interrupt controller interface logic 304 acknowledges the interrupt at the interface controller 312, and, in an embodiment, retrieves the interrupt vector value from the interrupt controller 312 and stores the interrupt vector value in the interrupt vector field 326 of the VMCS. A VM exit is then generated. Upon receiving control, the VMM may determine how the interrupt should be handled (e.g., by vectoring to a handler in the VMM, by invoking the appropriate VM to handle the interrupt, etc.). In an embodiment, this determination may be based upon the interrupt vector 326 from the VMCS 308.

Figure 4:
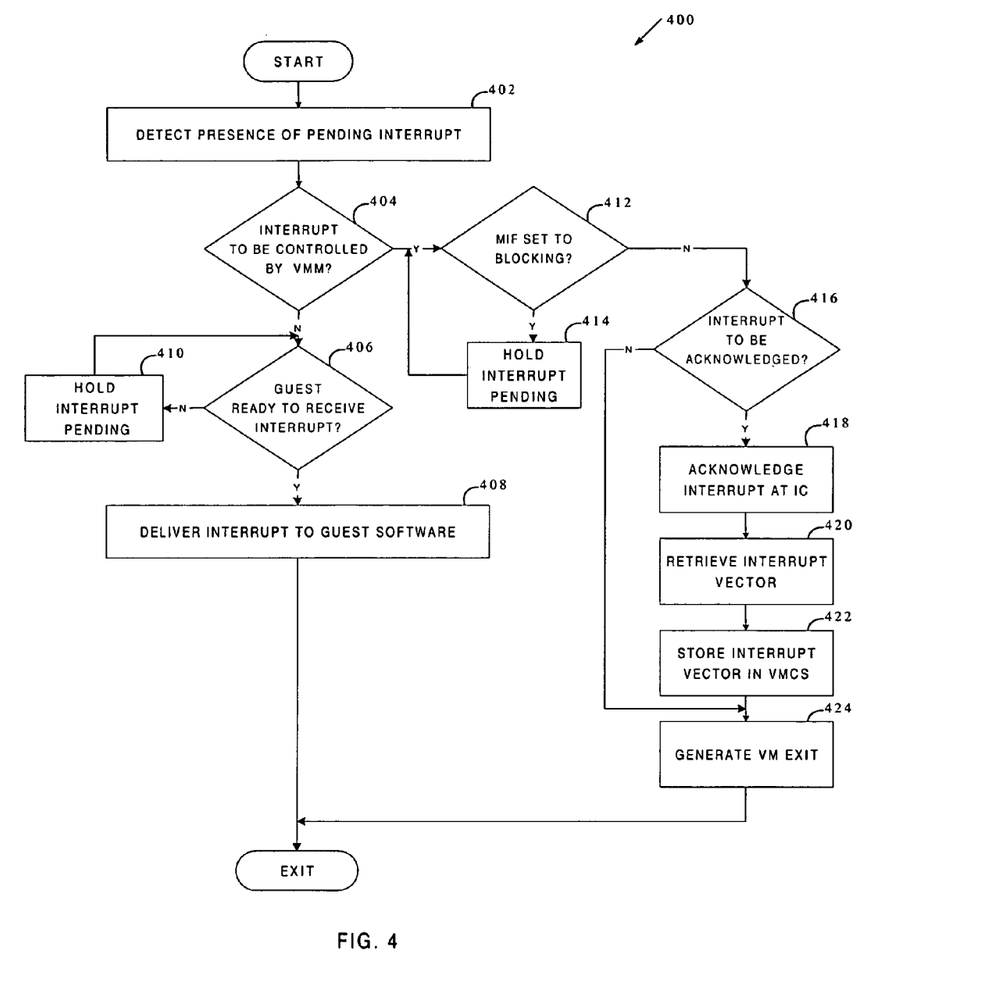
FIG. 4 is a flow diagram of one embodiment of a process for processing interrupts in a virtual machine system.

FIG. 4 is a flow diagram of one embodiment of a process 400 for processing interrupts in a virtual machine system. The process may be performed by processing logic that may comprise hardware (e.g., circuitry, dedicated logic, programmable logic, microcode, etc.), software (such as run on a general purpose computer system or a dedicated machine), or a combination of both.

Referring to FIG. 4, process 400 begins with processing logic identifying the presence of a pending interrupt during the operation of guest software (processing block 402). Next, processing logic determines whether the interrupt is to be controlled by a VMM or the guest software using an interrupt control indicator (decision box 404). If the interrupt control indicator specifies that the interrupt is to be controlled by the guest software, processing logic further determines whether the guest software is ready to receive interrupts (decision box 406). In one embodiment, this determination is made by consulting an interrupt flag (e.g., the IF bit in the EFLAGS register). If the determination is positive, processing logic delivers the interrupt to the guest software (processing block 408). The delivery of the interrupt to the guest software includes acknowledging the interrupt with the interrupt controller, retrieving the interrupt vector and passing control to the guest at the appropriate handler based on the vector. Otherwise, the interrupt is held pending (processing block 410) until the guest software becomes ready to handle interrupts.

If the interrupt is controlled by the VMM, in one embodiment, processing logic determines whether a monitor interrupt flag (MIF) is set to a blocking value (decision box 412). If so, the interrupt is held pending (processing block 414) until the MIF is changed to an unblock value. If not, processing logic further determines whether the interrupt is to be acknowledged using an interrupt acknowledge indicator (decision box 416). If not, processing logic does not acknowledge the interrupt and goes directly to processing block 424 to generate a VM exit.

If the interrupt is to be acknowledged, processing logic acknowledges the interrupt at the interrupt controller (processing block 418). In some embodiments, processing logic retrieves the interrupt vector from the interrupt controller (processing block 420) and stores the interrupt vector in the VMCS (processing block 422). Finally, processing logic generates a VM exit (processing block 424).

Thus, a method and apparatus for handling interrupts in a virtual machine system have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   recognizing an interrupt pending during an operation of guest software;
   determining that the interrupt is to cause a transition of control to a virtual machine monitor (VMM);
   determining whether the interrupt is to be acknowledged prior to the transition of control to the VMM;
   acknowledging the interrupt if the interrupt is to be acknowledged; and
   transitioning control to the VMM.

2. The method of claim 1 wherein determining whether the interrupt is to be acknowledged comprises determining whether an interrupt acknowledge indicator is set to an acknowledge value.

3. The method of claim 2 wherein the interrupt acknowledge indicator is controlled by the VMM.

4. The method of claim 2 wherein the interrupt acknowledge indicator is stored in a virtual machine control structure (VMCS).

5. The method of claim 1 further comprising:
   determining that the interrupt is not to be acknowledged prior to transitioning control to the VMM; and
   refraining from acknowledging the interrupt prior to completing the transition of control to the VMM.

6. The method of claim 1 wherein acknowledging the interrupt comprises:
   retrieving an identifier of the interrupt from an interrupt controller.

7. The method of claim 6 further comprising:
   causing information concerning the identifier of the interrupt to be available to the VMM after the transition of control to the VMM is completed.

8. The method of claim 7 wherein causing the information concerning the identifier of the interrupt to be available to the VMM comprises:
   storing the identifier of the interrupt in a virtual machine control structure (VMCS) prior to completing the transition of control to the VMM.

9. The method of claim 1 wherein determining that the interrupt is to cause the transition of control to the VMM comprises:
   determining that an interrupt control indicator is set to a VMM control value.

10. The method of claim 9 wherein the interrupt control indicator is stored in a virtual machine control structure (VMCS).

11. The method of claim 9 wherein determining that the interrupt is to cause the transition of control to the VMM further comprises:
    determining that a monitor interrupt flag is set to an unblocked value.

12. The method of claim 9 wherein the monitor interrupt flag is stored in a virtual machine control structure (VMCS).

13. An apparatus comprising:
    an interrupt controller to receive an interrupt from one or more system devices; and
    interrupt controller interface logic, coupled to the interrupt controller, to receive a notification of the interrupt from the interrupt controller, to determine that the interrupt is to cause a transition of control to a virtual machine monitor (VMM), to determine whether the interrupt is to be acknowledged prior to the transition of control to the VMM, to acknowledge the interrupt if the interrupt is to be acknowledged, and to transition control to the VMM.

14. The apparatus of claim 13 wherein the interrupt controller interface logic is to determine whether the interrupt is to be acknowledged by determining whether an interrupt acknowledge indicator is set to an acknowledge value.

15. The apparatus of claim 14 wherein the interrupt acknowledge indicator is controlled by the VMM.

16. The apparatus of claim 14 wherein the interrupt acknowledge indicator is stored in a virtual machine control structure (VMCS).

17. A system comprising:
    a memory to store one or more indicators; and a processor, coupled to the memory, to use the one or more indicators to determine that an interrupt is to cause a transition of control to a virtual machine monitor (VMM), to determine whether the interrupt is to be acknowledged prior to the transition of control to the VMM, to acknowledge the interrupt if the interrupt is to be acknowledged, and to transition control to the VMM.

18. The system of claim 17 wherein the processor is to determine whether the interrupt is to be acknowledged by determining whether an interrupt acknowledge indicator is set to an acknowledge value.

19. The system of claim 18 wherein the interrupt acknowledge indicator is controlled by the VMM.

20. The system of claim 18 wherein the interrupt acknowledge indicator is stored in a virtual machine control structure (VMCS).

21. An article of manufacture, comprising:

a machine-readable storage medium containing instructions which, when executed by a processing system, cause the processing system to perform a method, the method comprising:

recognizing an interrupt pending during an operation of guest software;

determining that the interrupt is to cause a transition of control to a virtual machine monitor (VMM);

determining whether the interrupt is to be acknowledged prior to the transition of control to the VMM;

acknowledging the interrupt if the interrupt is to be acknowledged; and transitioning control to the VMM.

22. The article of manufacture of claim 21 wherein determining whether the interrupt is to be acknowledged comprises determining whether an interrupt acknowledge indicator is set to an acknowledge value.

23. The article of manufacture of claim 22 wherein the interrupt acknowledge indicator is controlled by the VMM.

24. The article of manufacture of claim 22 wherein the interrupt acknowledge indicator is stored in a virtual machine control structure (VMCS).

* * * * *